United States Patent
Bertsche et al.

(10) Patent No.: US 10,764,142 B2
(45) Date of Patent: Sep. 1, 2020

(54) CLUSTERED APPLICATION MANAGEMENT WITH A BLOCKCHAIN

(71) Applicant: International Business Machines Corporation, Armonk, NY (US)

(72) Inventors: Ryan Bertsche, Poughkeepsie, NY (US); Robert J. Brenneman, Stormville, NY (US); Philip F. Chan, Poughkeepsie, NY (US); Helen C. Fischer, Wappingers Falls, NY (US); David Gross, Poughkeepsie, NY (US); Dulce Smith, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 15/814,906

(22) Filed: Nov. 16, 2017

(65) Prior Publication Data
US 2019/0149418 A1    May 16, 2019

(51) Int. Cl.
| | |
|---|---|
| H04L 12/24 | (2006.01) |
| H04L 29/08 | (2006.01) |
| G06Q 20/12 | (2012.01) |
| G06F 16/17 | (2019.01) |
| H04L 9/32 | (2006.01) |
| G06F 9/445 | (2018.01) |
| G06F 21/64 | (2013.01) |
| G06F 8/71 | (2018.01) |
| H04L 12/26 | (2006.01) |
| H04L 12/743 | (2013.01) |

(52) U.S. Cl.
CPC .......... *H04L 41/0893* (2013.01); *G06F 9/445* (2013.01); *G06F 16/1734* (2019.01); *G06F 21/64* (2013.01); *G06Q 20/1235* (2013.01); *H04L 9/3239* (2013.01); *H04L 67/10* (2013.01); *G06F 8/71* (2013.01); *H04L 43/106* (2013.01); *H04L 45/7453* (2013.01); *H04L 2209/38* (2013.01); *H04L 2209/60* (2013.01)

(58) Field of Classification Search
USPC ....................................................... 707/625
See application file for complete search history.

(56) References Cited

U.S. PATENT DOCUMENTS

| | | | |
|---|---|---|---|
| 9,690,675 B2 | 6/2017 | Madduri et al. | |
| 10,169,614 B2 * | 1/2019 | Brady | H04L 9/0643 |
| 2013/0212528 A1 * | 8/2013 | Lazaridis | G06F 3/14 |
| | | | 715/810 |
| 2015/0058291 A1 | 2/2015 | Earl et al. | |
| 2016/0292672 A1 * | 10/2016 | Fay | G06Q 20/363 |
| 2016/0323109 A1 | 11/2016 | McCoy et al. | |
| 2017/0011460 A1 * | 1/2017 | Molinari | G06Q 40/04 |
| 2017/0115976 A1 | 4/2017 | Mills | |
| 2017/0132421 A1 | 5/2017 | Unitt | |
| 2017/0134161 A1 | 5/2017 | Goeringer et al. | |
| 2017/0180211 A1 | 6/2017 | Johnson | |

(Continued)

*Primary Examiner* — Cam Linh T Nguyen (57) ABSTRACT

An example operation may include one or more of initiating an application cluster including a number of instances of an application, storing the application cluster members in a blockchain, identifying the application cluster members and testing whether communication paths to the cluster members are operable, creating a blockchain transaction including an account and status of the application cluster members, and storing the blockchain transaction in the blockchain.

20 Claims, 6 Drawing Sheets

(56) References Cited

U.S. PATENT DOCUMENTS

| | | | |
|---|---|---|---|
| 2017/0180469 A1 | 6/2017 | Ford et al. | |
| 2018/0096175 A1* | 4/2018 | Schmeling | B29C 64/10 |
| 2018/0101848 A1* | 4/2018 | Castagna | G06F 9/5016 |
| 2018/0255090 A1* | 9/2018 | Kozloski | H04L 63/1433 |
| 2018/0255130 A1* | 9/2018 | Kozloski | H04L 67/104 |
| 2018/0268386 A1* | 9/2018 | Wack | G06Q 20/102 |
| 2018/0268491 A1* | 9/2018 | Cuomo | G06Q 40/12 |
| 2018/0285879 A1* | 10/2018 | Gadnis | H04L 9/3231 |
| 2018/0287915 A1* | 10/2018 | Smith | H04L 51/30 |
| 2018/0309567 A1* | 10/2018 | Wooden | G06F 21/6209 |
| 2018/0323963 A1* | 11/2018 | Stollman | H04L 9/3239 |
| 2018/0330342 A1* | 11/2018 | Prakash | G06Q 20/4014 |
| 2018/0337769 A1* | 11/2018 | Gleichauf | H04L 9/3239 |
| 2018/0342171 A1* | 11/2018 | Darnell | G06Q 20/065 |
| 2018/0343175 A1* | 11/2018 | Bathen | H04L 41/5019 |
| 2018/0359089 A1* | 12/2018 | Innes | G06F 16/25 |
| 2019/0035014 A1* | 1/2019 | Bell | H04L 9/3239 |
| 2019/0058590 A1* | 2/2019 | Watanabe | G06Q 20/065 |
| 2019/0065685 A1* | 2/2019 | Pickover | H04L 9/3297 |
| 2019/0108519 A1* | 4/2019 | Asif | H04L 9/3236 |
| 2019/0114182 A1* | 4/2019 | Chalakudi | H04L 9/3236 |
| 2019/0207762 A1* | 7/2019 | Xie | H04L 63/0272 |
| 2019/0386832 A1* | 12/2019 | Palyutina | H04L 63/0823 |

\* cited by examiner

CLUSTERED APPLICATION MANAGEMENT WITH A BLOCKCHAIN

TECHNICAL FIELD

This application generally relates to managing application functions on a blockchain, and more particularly, to clustered application management with a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

Software applications are crucial components to most organizations' day-to-day operations. The software applications should be operating at all times and even the smallest amount of downtime could be catastrophic. At the same time, there has been a shift towards remote (cloud) computing where individual machine uptime is not guaranteed. Currently, the most popular method of keeping applications highly available is clustering the application and running multiple instances of it on different machines. The replication of the application permits for some of the application instances to fail without causing the application to fail, thus providing a layer of redundancy. The instances of the application cluster that are still running keep the application running. Ideally, this operation is performed without any adverse effects on clients accessing the application.

However, one concern with the current system is the managing of the cluster logic among the nodes in the cluster. The management of the cluster should be dynamic to account for changes in the state of any of the cluster members. This is usually performed in an application specific manner, or by a third party management cluster. It is difficult to manage consensus in a cluster when network partitions and failures are expected to occur. Each software application that implements its own cluster management logic has to overcome this problem. In the case of third party applications used to monitor/manage the cluster, there is now an additional failure approach for the application. For example, if the management cluster that holds the state of the application goes down, the application also goes down, even if none of the instances of the actual application go down. Additionally, that management application must be clustered, and undergoes the same problem as to whether it manages its own clustering logic, or whether it uses another management cluster to manage its own clustering. This would lead to a never-ending chain of management servers, or management clusters managing themselves, which is the problem they were designed to solve in the first place.

SUMMARY

One example embodiment may provide a method that includes one or more of initiating an application cluster comprising a plurality of instances of an application, storing application cluster members in a blockchain, identifying the application cluster members and testing whether communication paths to the application cluster members are operable, creating a blockchain transaction comprising an account and status of the application cluster members, and storing the blockchain transaction in the blockchain.

Another example embodiment may include an apparatus that provides a processor configured to perform one or more of initiate an application cluster comprising a plurality of instances of an application, store application cluster members in a blockchain, identify the application cluster members and testing whether communication paths to the application cluster members are operable, create a blockchain transaction comprising an account and status of the application cluster members, and a memory configured to store the blockchain transaction in the blockchain.

Still another example embodiment may include a non-transitory computer readable storage medium configured to store instructions that when executed cause a processor to perform one or more of initiating an application cluster comprising a plurality of instances of an application, storing application cluster members in a blockchain, identifying the application cluster members and testing whether communication paths to the application cluster members are operable, creating a blockchain transaction comprising an account and status of the application cluster members, and storing the blockchain transaction in the blockchain.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to managing application functions on a blockchain, and in another embodiment relates to using a blockchain to maintain software application cluster instances and members with privileges to access the clustered application via management with a blockchain.

According to example embodiments, a software application cluster management procedure is implemented in a blockchain. In general, cluster management requires maintaining consensus and all the blockchain member nodes consistent, including updated membership, usage, rights, access, non-access, failure, activeness, etc. The architecture of a blockchain shared ledger aligns well with the challenges presented by software application cluster management.

In one example, each member of the cluster may be a node on the blockchain. The blockchain logic is independent of the application logic that permits this approach of management applicable to any clustered application. For instance, the blockchain would maintain a record of all members of the cluster and their current status (i.e., new, old, active, inactive, failed, priority, usage ratings, location, etc.). New blockchain transactions can be added to the blockchain by a simple consensus model approving such transactions for commitment, and which may be used to update the status of the cluster and its members.

Additionally, blockchain transactions may be set with time expirations, so a node in the application cluster could 'turn itself off' if a new update has not been written to its copy of the chain due to network isolation problem which prevented that particular node from communicating with the other nodes and receiving ledger updates. In this configuration, the clustered applications can simply query their own copy of the blockchain to obtain the address and status of the cluster peers, without network segmentation concerns, and additional failures caused by separate management clusters. The current state of the cluster will be tracked by the blockchain to ensure that each individual instance of a clustered application is in a consistent state. This approach is identified by a distributed blockchain that is explicitly aware of all other nodes in the blockchain, and which can add and expel members based on each node in the blockchain's connection to each another node. The model of consensus used to determine which nodes should be added/removed is not important, as there already are many different ways for mapping connectivity among nodes in a cluster. The blockchain may persist transactions about its own state, and the state of the different members of the blockchain, such as a self-referential blockchain that stores metadata about itself. Also, the blockchain may be a self-managing blockchain with a clustered application.

A clustered application is referring to a software application where multiple instances of the same applications logically run as a single instance. In a clustered application, each instance must maintain a consistent configuration with each other instance, and be aware of the statuses of those instances. In this configuration, each instance of the clustered application would run on the same machine/operating system as an instance of the blockchain. Each clustered application instance would read and write its application state to its local blockchain instance. The blockchain logic would maintain the data stored in the master copy of the blockchain consistent across all instances of the blockchain maintained by any of the nodes. The information maintained by the blockchain is not necessarily the application data, but configuration information and application state information.

Figure 1:
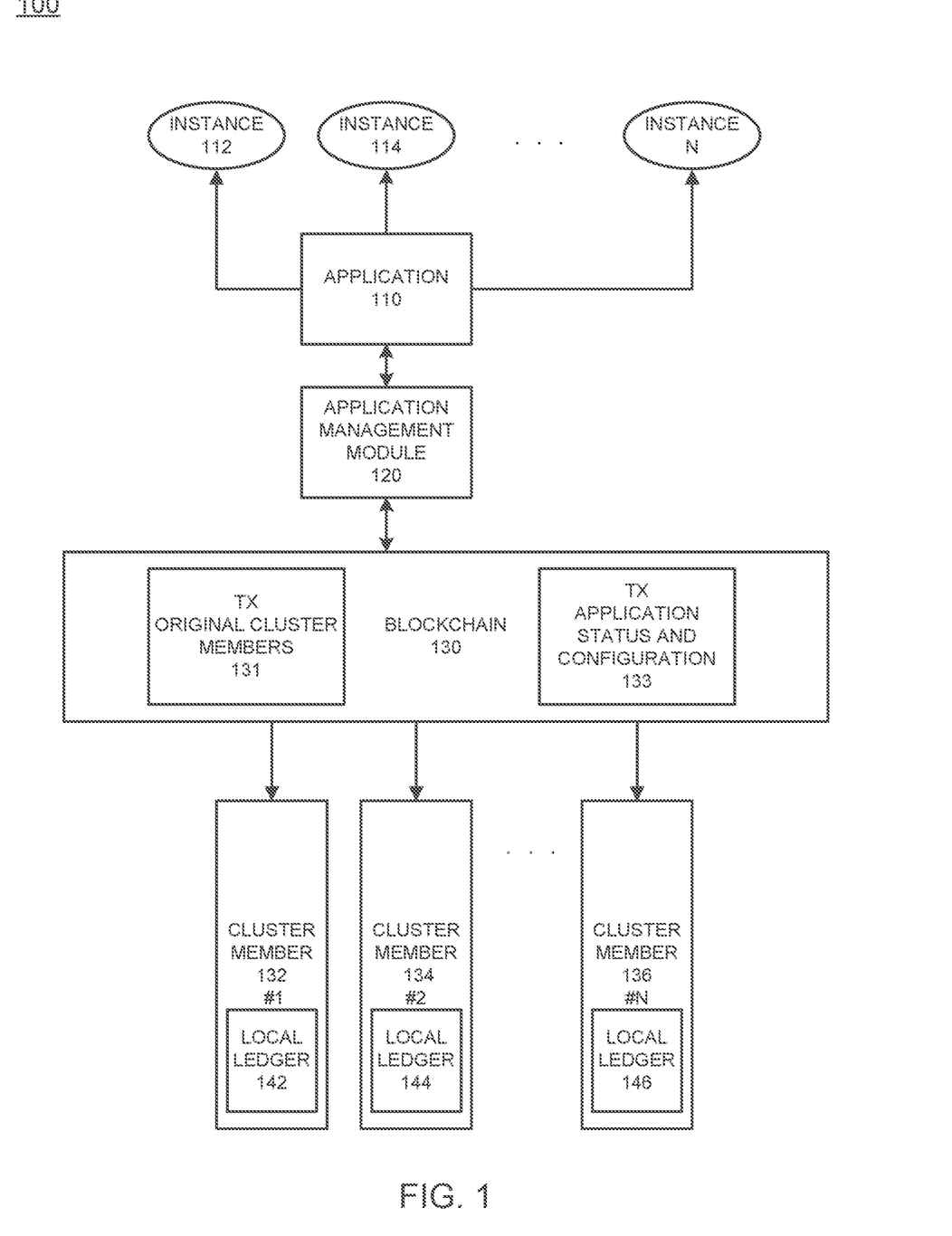
FIG. 1 illustrates a logic diagram of an application cluster and corresponding management service operating on a blockchain, according to example embodiments.

FIG. 1 illustrates a logic diagram of an application cluster and corresponding management service operating on a blockchain, according to example embodiments. Referring to FIG. 1, the configuration 100 includes a blockchain 130, which may be maintained in each of the cluster members 132-136, as local ledgers 142-146. The number of cluster members may vary as well as the number of application instances 112, 114 . . . N. The application itself 110 may be an enterprise application operating on a server(s) or cloud computing platform which enables access to many members and their respective computing devices. An application management module 120 may be a binding or other application interface that accesses the application computing platform and the blockchain 130. The content of the blockchain is primarily cluster member information 131, which may be updated each time a cluster member audit is performed to identify a current status of the members and their activity on the cluster. Other information may include status and configuration information 133 of the application and its members.

The consensus of the cluster state may be a configuration that is identified and which resides on the blockchain, and the blockchain will persist on the same instance as the cluster member, which removes the need for a separate management cluster and removes that failure path. In operation, the blockchain will originate with a seeding transaction that includes group information of the original cluster members when the application cluster is first launched. The application will identify a list of known cluster peers from the blockchain records and then test connectivity/communication with those cluster members, such as a ping response request or other request for information/availability. The application will then write a transaction to the blockchain that includes information of all the cluster members identified from the last known list of cluster members, which it can currently identify as active cluster members based on feedback responses from the communication testing efforts. The blockchain will then propagate that updated list of cluster member information to all the other cluster members it can reach. Those members may update their own blockchain information with the new transaction information. Consensus may be setup and reached to and such information may be updated as transactions which eventually becomes a block that is then propagated through the chain.

The application may read a most current block for active members of the cluster, and update itself accordingly. The inactive nodes in the cluster are fenced from all active nodes because it can be guaranteed that all parties are reading the same most recent block. Blocks may have set expiration times, based on an amount of time between check-up operations, and thus an isolated cluster node who receives no updated block will default to inactive and turn itself off and stop attempting to communicate and use the application instances. New nodes can be added to the cluster simply by starting a new member with the blockchain cluster management application and broadcasting a transaction as a new member. If most of the other nodes can identify the new member notification then it will be added to the block and will become known to the application management function, in general, which can also carry the state of the cluster beyond available and unavailable. Other fields, such as initializing, new, lag, etc., are possible in this model, depending on the clustered application logic. By fencing inactive nodes, the current active count may be reduced and the list of current nodes may be adjusted which assists with the (n/2+1) split-brain dilemma known to clustering, which is a state when a cluster of nodes is divided (or partitioned) into smaller clusters each of which believes it is the only active cluster.

Figure 2:
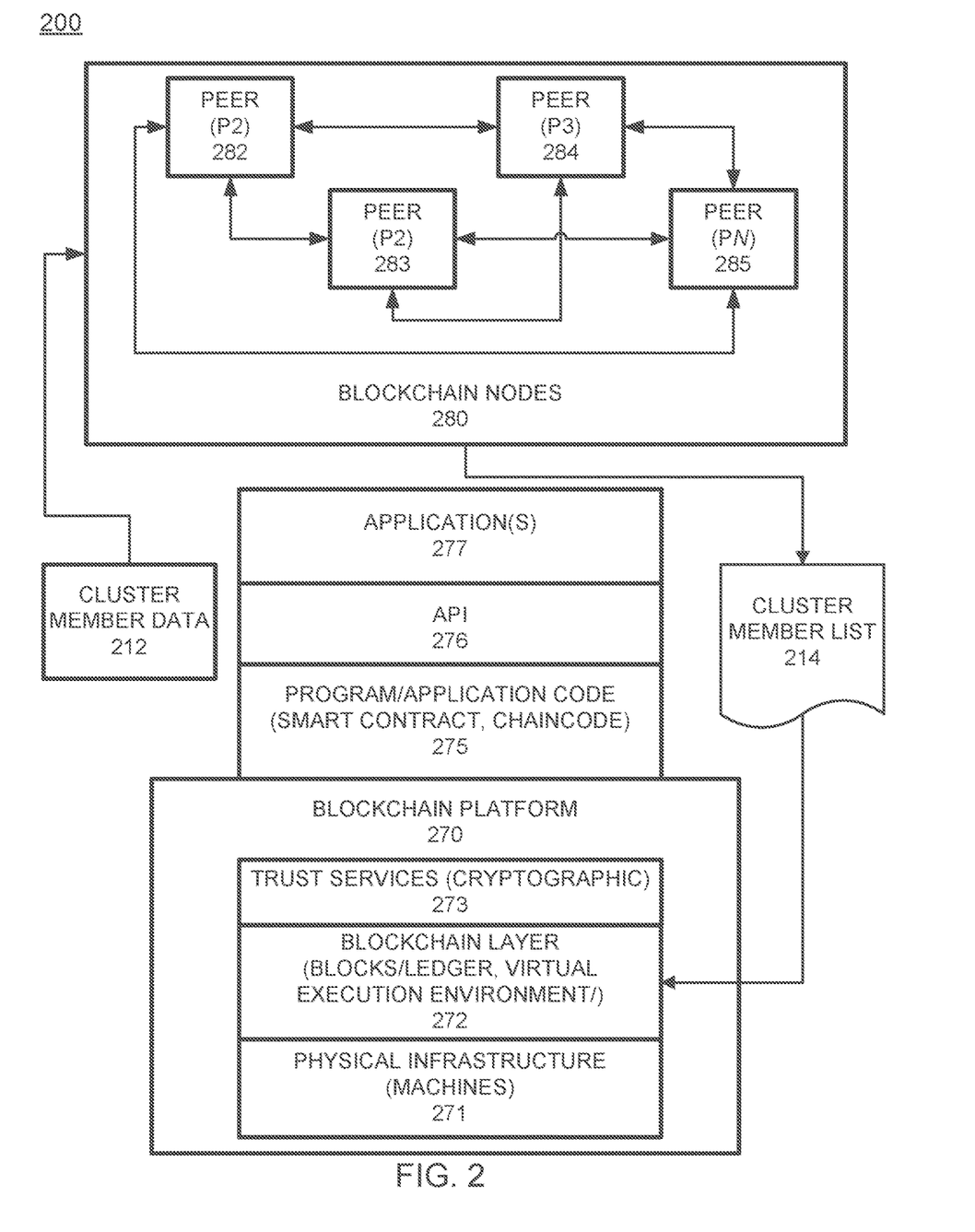
FIG. 2 illustrates an example blockchain configuration for performing application cluster management on blockchain, according to example embodiments.

FIG. 2 illustrates an example blockchain configuration for performing application cluster management, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, cluster application data, such as updated member data 212 may be identified by the peer nodes 280. The nodes may identify updated transactions with member information and then at some point reach consensus and permit the block/transaction to be created/committed to the blockchain ledger 272 provided that certain conditions are satisfied. Also, the cluster member list 214 may be committed to the blockchain each time an audit is performed to update information.

Overall, there is always a consistent mapping of what nodes in the cluster are available. All clustered applications could share this same configuration and have more consistency across cluster configurations. The cluster represents an application with various instances or processes. In the application cluster, the blockchain keeps track of active cluster members, and is responsible for making sure that every active member of the cluster is reading from the configuration. The application specific code running outside of the blockchain on a computing platform actually reads the member state information off of the local blockchain instance and uses that information to cluster itself. If that application code reports that it cannot connect to certain cluster members that are listed as 'active' according to its local blockchain instance, then the local blockchain instance will then propagate that member state change to blockchain peers.

According to example embodiments, when a new cluster is being initialized, the blockchain must be seeded with an initial state. This initial state includes all the initial cluster members with an active state. Each of the initial cluster members will have a local blockchain instance with this identical initial seeding. All of the instances are operated together, and operate with the exact same logic as a cluster in any state. The application will try to connect with the active cluster members in the initial seeding operation by reading its local blockchain. If any members are unavailable, the application will write the state change to its local blockchain version, which will then propagate the transaction to the other blockchain peers in the initial seeding list, and from that effort the initial state is verified once the first block is written.

In the event that a new member is seeking to join the network, its local blockchain (local ledgers 142-146) must be synchronized with the blockchain network and it must join as a peer. One approach is to have secure keys required for a new blockchain peer to join the blockchain network, which is not necessarily required, but is common in blockchain networks. Once the local blockchain instance of the new cluster members are updated with the most current block, the application instance will read the configuration from the updated blockchain information. Since there will not be a blockchain transaction for this new cluster member yet, the application can check that it can connect to itself, and write a new transaction to its local blockchain. This transaction will be performed to add the new cluster member with a state of 'initializing'. The initialization state indicates that the cluster member is new and permits the application logic to verify that information and perform any application specific initialization tasks. If that transaction is accepted by the blockchain peers, it will reside in a next block. All cluster members, including the newly added instance, will read that new block from their local blockchains and the applications will try to connect to that newly joined member. At that point, the cluster will identify to the new members as it does the other members.

In the event that a member becomes inactive to a majority of the other blockchain peers, a transaction will be included in the next block that sets the state of that peer to 'inactive'. All current blockchain peers will then read that block and have a consistent state that shows that the peer is inactive. The instance that has just become inactive can read its own local blockchain and see that its state is inactive. The application can then see it is no longer in the cluster and respond accordingly. The course of action of an inactive application would depend on the logic of the specific application. When an inactive member is trying to rejoin the cluster, it can only do so if it has an updated version of the blockchain with all current blocks. If this is the case, it can broadcast a request to all other blockchain peers, stating that it is active. If the majority of the blockchain peers see this request, the state will be changed via a transaction that is part of the next block. In cases where a blockchain peer does not receive a new block in the correct amount of time (T1), it will set its own state to inactive, and broadcast that as a transaction to all other reachable peers. This does not mean that the peer is removed from the cluster, its state is merely set to inactive. When the clustered application is reading its own state from the blockchain, it can see that it should shut itself down to prevent it from running on an outdated view of the cluster. This is performed to guarantee that all cluster members are always reading the same configuration. If a cluster member loses network connectivity, or fails to receive a new block for any reason, it cannot continue to operate under the old configuration. This can lead to multiple clusters running in inconsistent states, which is not permissible in the present configuration.

Figure 3:
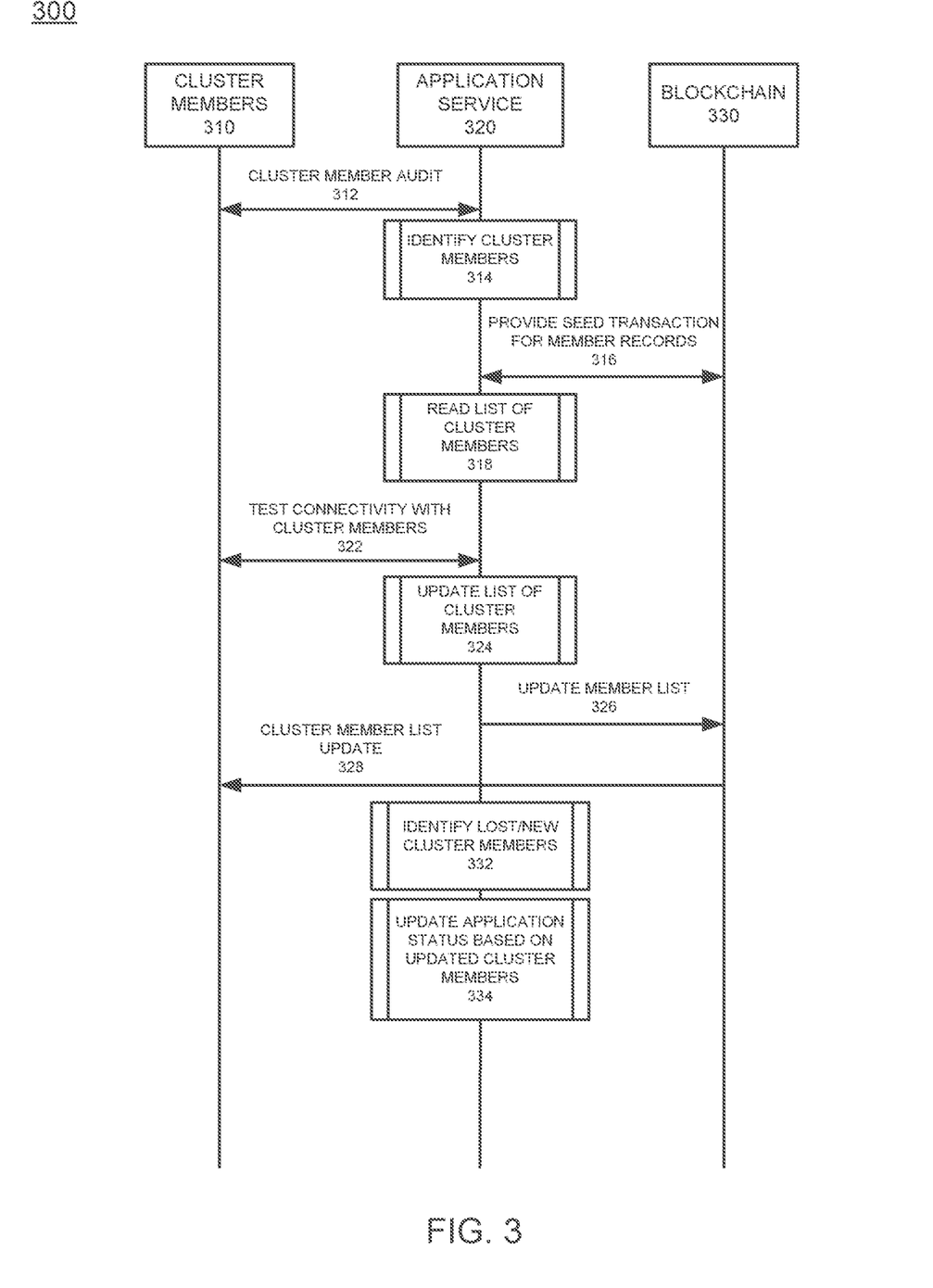
FIG. 3 illustrates a system messaging diagram for processing application cluster management, according to example embodiments.

FIG. 3 illustrates a system messaging diagram for processing application cluster management, according to example embodiments. Referring to FIG. 3, the configuration 300 provides cluster members 310, an application service 320 and a blockchain 330. The cluster members may represent various ones or just one of the blockchain member nodes. In operation, the application service may request information or receive broadcast information from the members 312 regarding status and/or in response to requests for a current connectivity status. The members may be identified 314 in an updated list and a seed transaction may be sent 316 to the blockchain to have the transaction information updated. The list of cluster members 318 may be identified and then a test 322 can be performed to confirm the members' active status. Any updates or changes can be identified and the list can be changed to reflect those updates, such as a new member, a non-responsive member, etc. The list of cluster members may be updated 324 and committed to the blockchain 326. The updated list is then broadcast to all members 328 and a confirmation of the updated list vs. the local ledgers of the members can be performed to overwrite the previous list 332. The updated application status may be performed to update the statuses of the members 334.

Figure 4A:
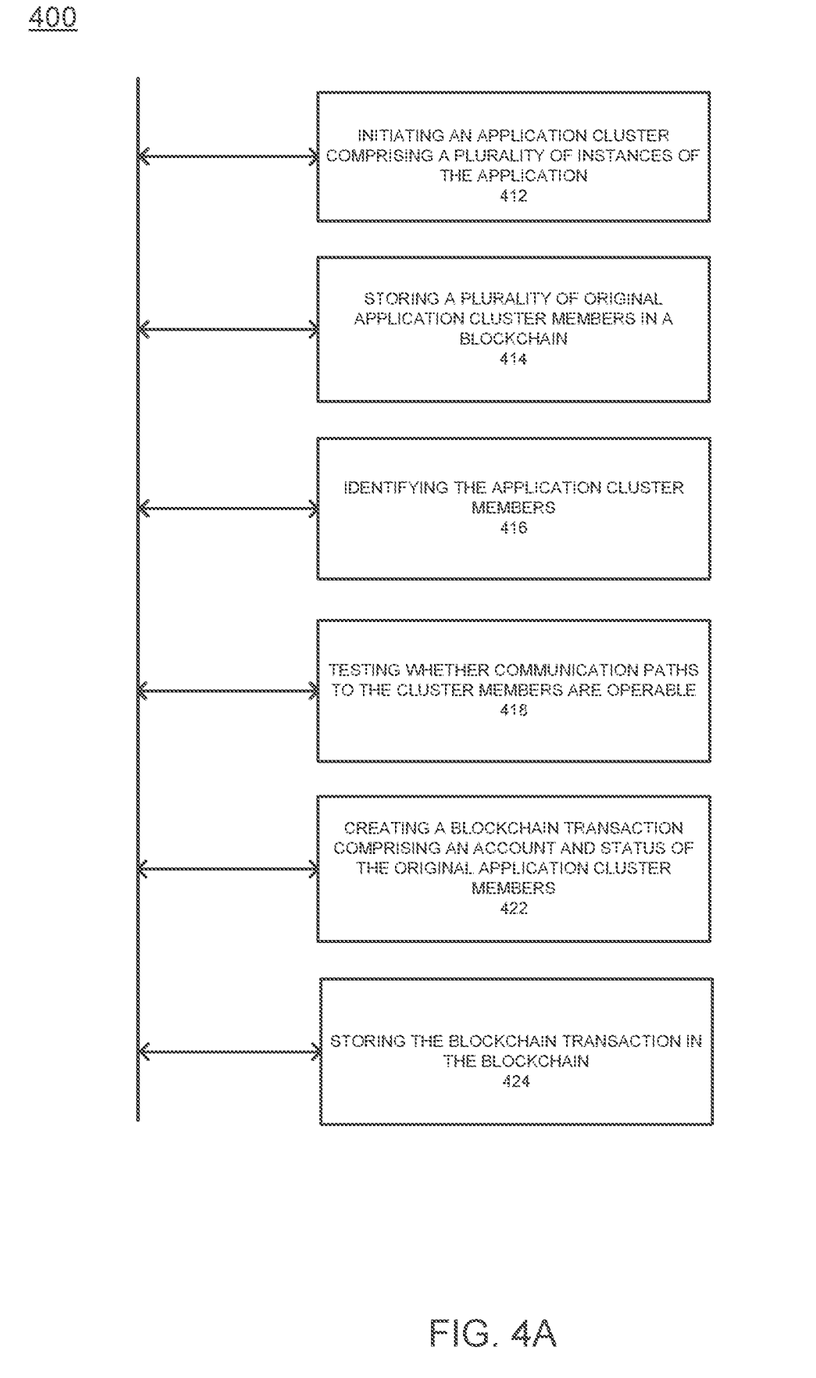
FIG. 4A illustrates a flow diagram of an example method of managing application cluster management, according to example embodiments.

FIG. 4A illustrates a flow diagram of an example method of managing application cluster management, according to example embodiments. Referring to FIG. 4, the method 400 may include initiating an application cluster comprising a plurality of instances of the application 412, storing a plurality of original application cluster members in a blockchain 414, identifying the application cluster members 416 and testing whether communication paths to the cluster members are operable 418, creating a blockchain transaction comprising an account and status of the original application cluster members 422 and storing the blockchain transaction in the blockchain 424. The plurality of instances of the application can be executed in a cloud network. The method may also include identifying one or more new blocks to be stored in the blockchain, updating the application cluster members with the one or more new blocks, identifying one or more of the application cluster members has not received the one or more new blocks, and designating the one or more application cluster members without the one or more new blocks as having an inactive status. The method may also include identifying active status instances of the application based on the one or more application cluster members having an active status, and creating a new transaction to update the active status instances of the application. The method may also include identifying one or more of the application cluster members which should or should not have access to the application, performing a consensus among blockchain peer nodes to confirm updates to a list of application cluster members, and storing the consensus approved list of application cluster members in the blockchain, and forwarding the consensus approved list of application cluster members to all blockchain peer nodes. The method may also include receiving a broadcast update message from a new blockchain node seeking access to the application, adding the new blockchain node to an active list of application cluster members, and storing an updated transaction in the blockchain to include the new blockchain node and the active list of application cluster members.

Figure 4B:
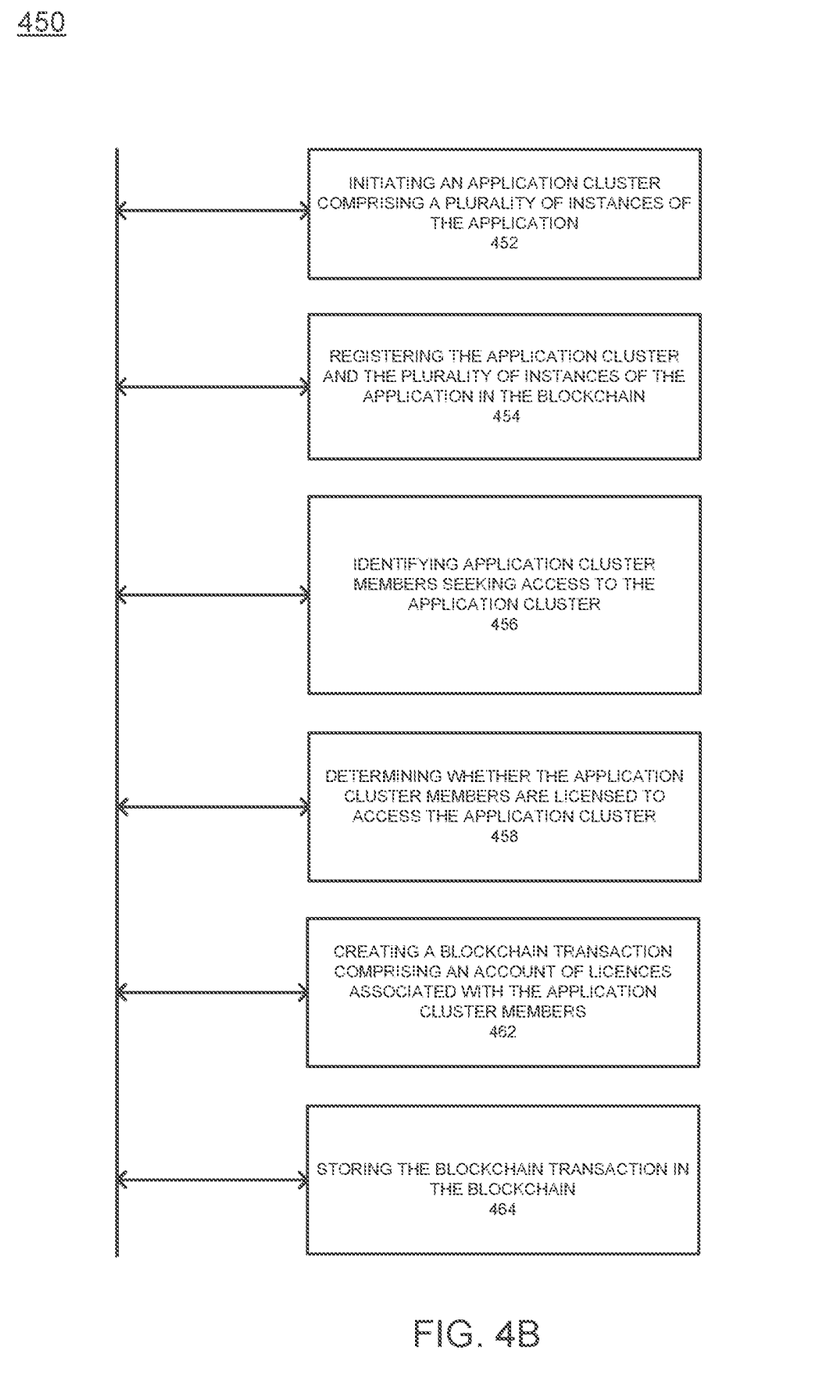
FIG. 4B illustrates another flow diagram of an example method of managing and application cluster management, according to example embodiments.

FIG. 4B illustrates another flow diagram of an example method of managing and application cluster management, according to example embodiments. Referring to FIG. 4B, the method 450 may include initiating an application cluster comprising a plurality of instances of the application 452, registering the application cluster and the plurality of instances of the application in the blockchain 454, identifying application cluster members seeking access to the application cluster 456, determining whether the application cluster members are licensed to access the application cluster 458, creating a blockchain transaction comprising an account of licenses associated with the application cluster members 462, and storing the blockchain transaction in the blockchain 464.

In addition to the cluster management of access and group members, it may be prudent to identify licensing information for optimizing membership dues and other records related to the cluster application use and rights of use. For example, as cluster members are identified as seeking access to the application cluster, their license rights may be audited and a blockchain transaction may be created to identify each of the users. The active or legitimate access rights may also be stored in the blockchain and referenced to identify the legitimate users and the those who are not registered and do not have an active license. This enables an identification of those who are not licensed and may provide a way to create an alert or notification to a registered administrator to take the appropriate action.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
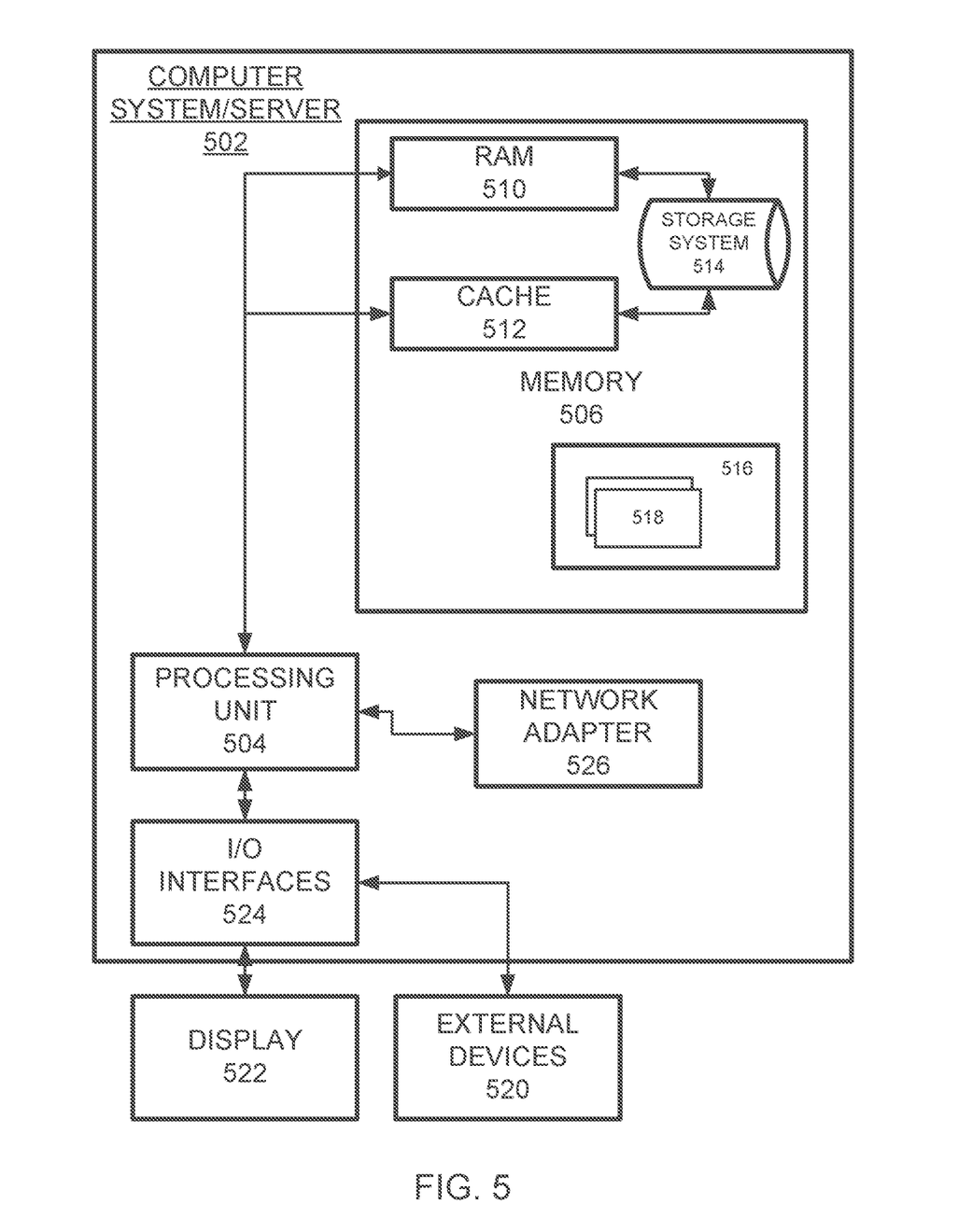
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    initiating an application cluster comprising a plurality of instances of an application;
    storing information indicating application cluster members in a blockchain, the application cluster members executing the plurality of instances of the application, each of the plurality of instances corresponding to a replication of the application;
    identifying the application cluster members and testing whether communication paths to the application cluster members are operable;
    creating a blockchain transaction indicative of a cluster state based on results of the testing, the cluster state comprising information indicating an account and an activity status of each of the application cluster members; and
    storing the blockchain transaction in the blockchain.

2. The method of claim 1, wherein the plurality of instances of the application are executed in a cloud network.

3. The method of claim 1, further comprising:
    identifying one or more new blocks to be stored in the blockchain;
    updating the application cluster members with the one or more new blocks;
    identifying that one or more of the application cluster members has not received the one or more new blocks; and
    designating the one or more application cluster members without the one or more new blocks as having an inactive status.

4. The method of claim 3, further comprising:
    identifying active status instances of the application based on the one or more application cluster members having an active status; and
    creating a new transaction to update the active status instances of the application.

5. The method of claim 1, further comprising:
    identifying one or more of the application cluster members which should or should not have access to the application;
    performing a consensus among blockchain peer nodes to confirm updates to a list of the application cluster members; and
    storing the list of application cluster members in the blockchain.

6. The method of claim 5, further comprising:
    forwarding the list of application cluster members to all blockchain peer nodes.

7. The method of claim 6, further comprising:
    receiving a broadcast update message from a new blockchain node seeking access to the application;

adding the new blockchain node to the list of application cluster members; and storing an updated transaction in the blockchain to include the new blockchain node and the list of application cluster members.

8. An apparatus, comprising:
a processor configured to:
  initiate an application cluster comprising a plurality of instances of an application;
  store information indicating application cluster members in a blockchain, the application cluster members executing the plurality of instances of the application, each of the plurality of instances corresponding to a replication of the application;
  identify the application cluster members and test whether communication paths to the application cluster members are operable; and
  create a blockchain transaction indicative of a cluster state based on results of the testing, the cluster state comprising information indicating an account and an activity status of each of the application cluster members; and
a memory configured to store the blockchain transaction in the blockchain.

9. The apparatus of claim 8, wherein the plurality of instances of the application are executed in a cloud network.

10. The apparatus of claim 8, wherein the processor is further configured to:
  identify one or more new blocks to be stored in the blockchain;
  update the application cluster members with the one or more new blocks;
  identify one or more of the application cluster members has not received the one or more new blocks; and
  designate the one or more application cluster members without the one or more new blocks as having an inactive status.

11. The apparatus of claim 10, wherein the processor is further configured to:
  identify active status instances of the application based on the one or more application cluster members having an active status; and
  create a new transaction to update the active status instances of the application.

12. The apparatus of claim 8, wherein the processor is further configured to:
  identify one or more of the application cluster members which should or should not have access to the application;
  perform a consensus among blockchain peer nodes to confirm updates to a list of the application cluster members; and
  store the list of application cluster members in the blockchain.

13. The apparatus of claim 12, wherein the processor is further configured to:
  forward the list of application cluster members to all blockchain peer nodes.

14. The apparatus of claim 13, further comprising:
  a receiver configured to receive a broadcast update message from a new blockchain node seeking access to the application; and
  wherein the processor is further configured to:
  add the new blockchain node to the list of application cluster members; and
  store an updated transaction in the blockchain to include the new blockchain node and the list of application cluster members.

15. A non-transitory computer readable storage medium configured to store instructions that when executed cause a processor to perform:
  initiating an application cluster comprising a plurality of instances of an application;
  storing information indicating application cluster members in a blockchain, the application cluster members executing the plurality of instances of the application, each of the plurality of instances corresponding to a replication of the application;
  identifying the application cluster members and testing whether communication paths to the application cluster members are operable;
  creating a blockchain transaction indicative of a cluster state based on results of the testing, the cluster state comprising information indicating an account and an activity status of each of the application cluster members; and
  storing the blockchain transaction in the blockchain.

16. The non-transitory computer readable storage medium of claim 15, wherein the plurality of instances of the application are executed in a cloud network.

17. The non-transitory computer readable storage medium of claim 15, wherein the processor is further configured to perform:
  identifying one or more new blocks to be stored in the blockchain;
  updating the application cluster members with the one or more new blocks;
  identifying one or more of the application cluster members has not received the one or more new blocks; and
  designating the one or more application cluster members without the one or more new blocks as having an inactive status.

18. The non-transitory computer readable storage medium of claim 17, wherein the processor is further configured to perform:
  identifying active status instances of the application based on the one or more application cluster members having an active status; and
  creating a new transaction to update the active status instances of the application.

19. The non-transitory computer readable storage medium of claim 15, wherein the processor is further configured to perform:
  identifying one or more of the application cluster members which should or should not have access to the application;
  performing a consensus among blockchain peer nodes to confirm updates to a list of the application cluster members; and
  storing the list of application cluster members in the blockchain.

20. The non-transitory computer readable storage medium of claim 19, wherein the processor is further configured to perform:
  forwarding the list of application cluster members to all blockchain peer nodes,
  receiving a broadcast update message from a new blockchain node seeking access to the application;
  adding the new blockchain node to an active list of application cluster members; and storing an updated transaction in the blockchain to include the new blockchain node and the list of application cluster members.

* * * * *